(12) United States Patent
Aoki et al.

(10) Patent No.: US 9,637,072 B2
(45) Date of Patent: May 2, 2017

(54) ELECTRICAL CONNECTION BOX

(71) Applicant: Sumitomo Wiring Systems, Ltd., Yokkaichi, Mie (JP)

(72) Inventors: Osamu Aoki, Mie (JP); Takashi Shiraki, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/063,204

(22) Filed: Mar. 7, 2016

(65) Prior Publication Data
US 2016/0276818 A1  Sep. 22, 2016

(30) Foreign Application Priority Data

Mar. 19, 2015 (JP) ................................. 2015-056961

(51) Int. Cl.
*B60R 16/023*  (2006.01)
(52) U.S. Cl.
CPC .............................. *B60R 16/0238* (2013.01)
(58) Field of Classification Search
CPC ............ B60R 16/0238; B60R 16/0239; B60R 16/033; H02G 5/08; H02G 3/18; H02G 3/08; H01R 13/447
USPC ......... 361/624–641; 439/77, 620.21, 620.27, 439/620.29, 949, 76.2
See application file for complete search history.

(56) References Cited

U.S. PATENT DOCUMENTS

2011/0100705 A1* 5/2011 Matsui ................ B60R 16/0238
174/535

2014/0374139 A1* 12/2014 Akahori .............. B60R 16/0238
174/135
2015/0303669 A1* 10/2015 Maebashi ............ H05K 5/0052
174/68.2
2016/0020536 A1* 1/2016 Tashiro ............... B60R 16/0238
439/527
2016/0049780 A1* 2/2016 Kawamura .......... H05K 5/0247
174/541
2016/0181777 A1* 6/2016 Kawamura ......... B60R 16/0238
174/50
2016/0276818 A1* 9/2016 Aoki ................... B60R 16/0238
(Continued)

FOREIGN PATENT DOCUMENTS

JP            2013027224 A       2/2013

*Primary Examiner* — Anthony Haughton
*Assistant Examiner* — Yahya Ahmad
(74) *Attorney, Agent, or Firm* — Reising Ethington, P.C.

(57) ABSTRACT

An electrical connection box includes a terminal supporting wall that has a rescue terminal portion of a bus bar arranged on the front surface and is provided as a single piece with a block main body, and a cover member that exposes and covers the terminal supporting wall and the rescue terminal portion. Bearing holes are provided in the terminal supporting wall on one end side in the left-right direction, rotation support shaft portions that are rotatably fitted into the bearing holes are provided as protrusions on the cover member, the rescue terminal portion is exposed by rotating the cover member from an opening/closing end on the other end side in the left-right direction with the rotation support shaft portions serving as fulcrums, and ribs for holding the cover member in an isolating state are provided as protrusions on the opening/closing end side of the cover member and are semi-locked into latching depressions provided on the terminal supporting wall.

5 Claims, 9 Drawing Sheets

(56) References Cited

U.S. PATENT DOCUMENTS

2016/0294075 A1* 10/2016 Shiraki .................... H01R 9/18
2016/0295714 A1* 10/2016 Taniguchi ........... B60R 16/0238

* cited by examiner

Fig. 4A
Fig. 4B
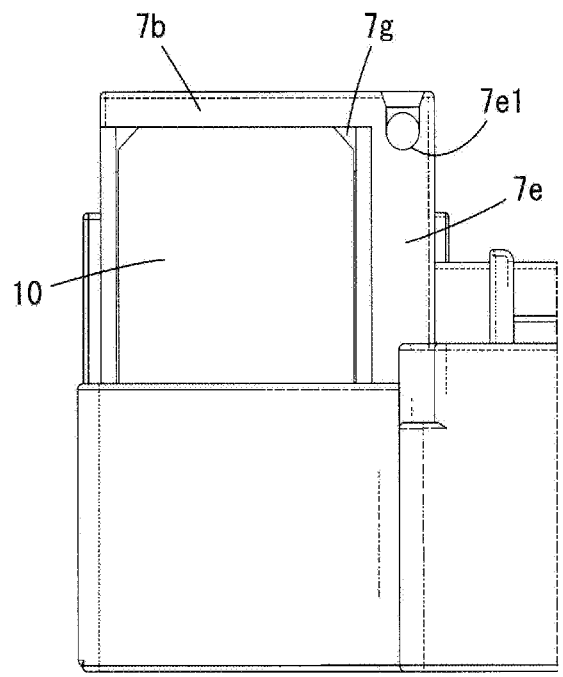
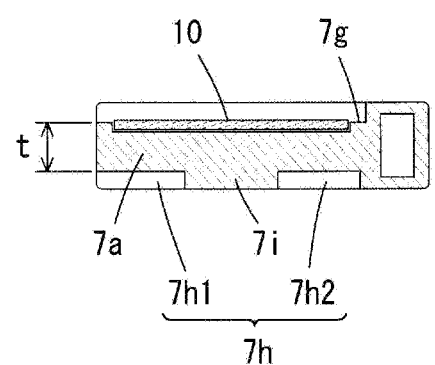

Fig. 9A
Fig. 9B
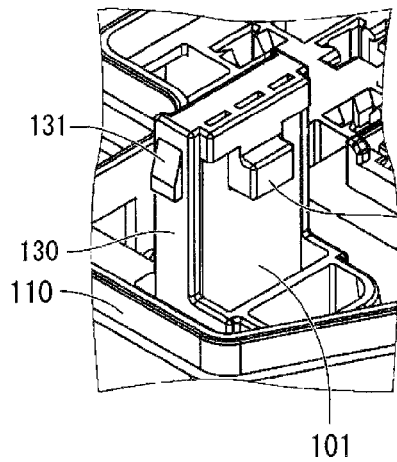
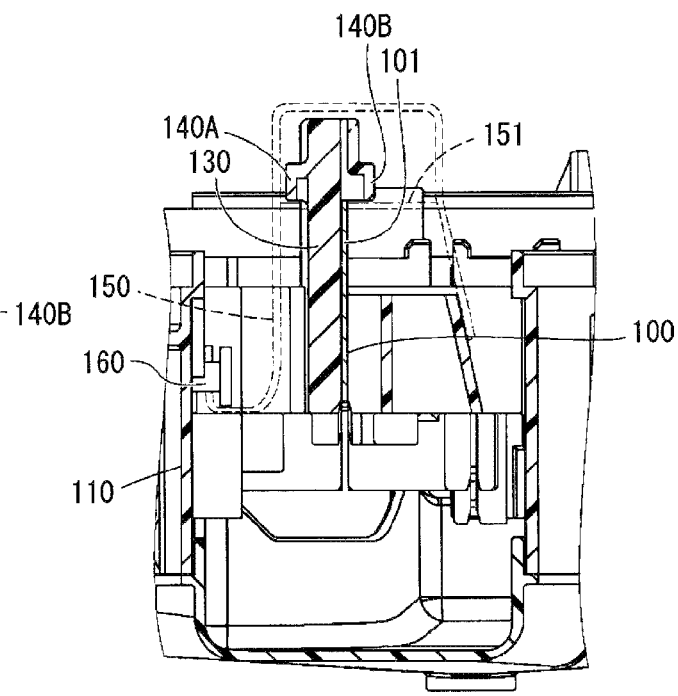
Fig. 9C
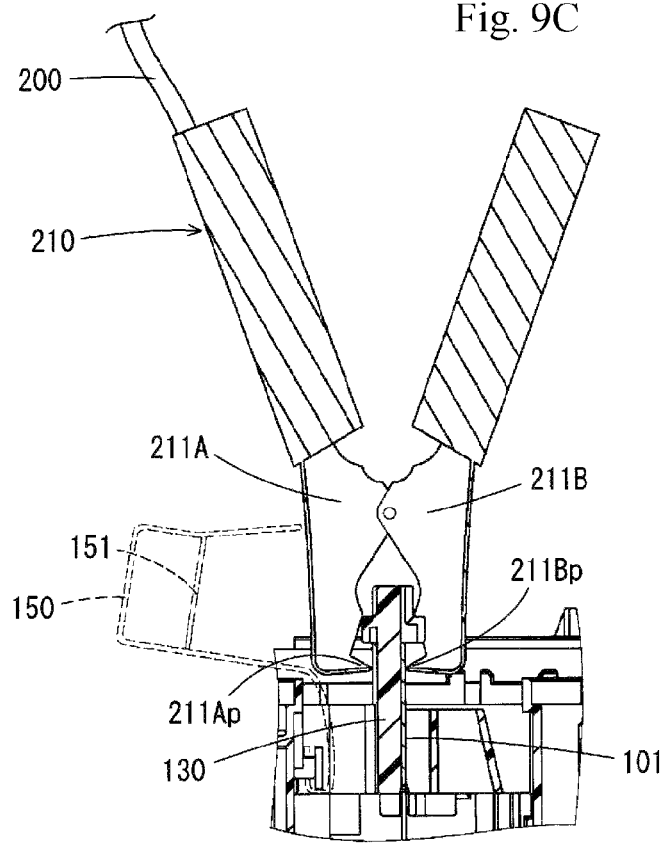

ELECTRICAL CONNECTION BOX

This application claims the benefit of Japanese Application No. JP2015-056961, filed on Mar. 19, 2015, the contents of which are hereby incorporated by reference in their entirety.

FIELD

The present invention relates to an electrical connection box for an automobile, and specifically relates to an electrical connection box that includes a bus bar provided with an emergency charging terminal portion (so-called rescue terminal portion) that makes it possible to connect a booster cable clip when the battery is dead. In this electrical connection box, improvements have been made to the cover for the terminal portion and the holding wall of the rescue terminal portion, spontaneous opening when a cover opening operation has not been performed is reliably prevented, the cover opening operation is made easier, and the booster cable clip and the terminal portion are reliably brought into contact.

BACKGROUND

In JP 2013-27224A (Patent Document 1), the applicant of this application has provided an electrical connection box that includes a countermeasure for the case where the battery dies and an automobile cannot be started. As shown in FIGS. 9A to 9C, this electrical connection box is an electrical connection box such as a fuse box or a relay box installed in an engine room or engine compartment, is provided with a rescue terminal portion 101 for emergency charging in a portion of a bus bar 100 connected to the battery, and a clip 210 of a booster cable 200 can be connected to the rescue terminal portion 101. The rescue terminal portion 101 is attached so as to be overlaid on one surface of a bus bar supporting wall 130 that projects upward from a box body 110 of the electrical connection box, and block-shaped clip latch protrusions 140A and 140B are respectively provided in the centers of the two sides of the bus bar supporting wall 130. Clip pieces on the two sides of the clip 210 latch to and clamp the clip latch protrusions 140A and 140B, and thus the clip 210 can stably come into contact with the rescue terminal portion 101.

Also, in order to isolate the rescue terminal portion 101 so as to not normally come into contact with outside members, a cover member 150 indicated by dashed lines in FIGS. 9B and 9C is latched and attached to an attachment portion 160 that projects from the box body so as to cover the bus bar supporting wall 130 and the rescue terminal portion 101, latching catches 131 are provided so as to project from the two side walls of the bus bar supporting wall 130, and the latching catches 131 engage with latching ribs 151 provided on the inner face of the cover member 150 so as to hold an isolating state. When the clip 210 is to be connected to the rescue terminal portion 101, the latching of the latching catches and the latching ribs is released, and the cover member 150 is removed so as to expose the rescue terminal portion 101.

JP 2013-27224A is an example of related art.

With the electrical connection box disclosed in Patent Document 1, when the battery has died, the booster cable clip 210 is to be connected to the battery rescue terminal portion 101 accommodated in the electrical connection box, and thus the cover member 150 is removed along with the upper case. Removing the cover member 150 requires the task of releasing the latching of the latching catches on the two sides and the latching ribs of the cover member, and then after the clip 210 has been connected to the rescue terminal portion 101 and charging is complete, the occupant needs to perform the covering task of placing the cover member 150 over the bus bar supporting wall and the rescue terminal portion and latching the latching ribs to the latching catches.

The task of opening the cover member 150 cannot be performed with only one hand, and the task is not easy to perform. Also, there is no mechanism for reliably holding the opened cover member 150 at the opened position, and there is a risk of the cover member 150 interfering when performing the task of connecting the clip.

Furthermore, in Patent Document 1, in order to bring into contact and hold the rescue terminal portion 101 and the booster cable clip 210, the clip latch protrusions 140A and 140B are respectively provided at the centers of the two sides of the bus bar supporting wall 130, and tip bent portions 211Ap and 211Bp of clip pieces 211A and 211B on the two sides of the clip 210 are brought into contact with and latched to the lower surfaces of the clip latch protrusions 140A and 140B.

However, consider the case where, as shown in FIGS. 6A to 6C, an alligator clip 300 is used, and the alligator mouth shape of tip bent portions 301 (301a and 301b) of the clip pieces on the two sides is a shape in which circular arc-shaped depressions 302 are provided in the central portion, and terminal protrusions 303a1 and 303b1 as well as 303a2 and 303b2 are provided on respective sides of the depressions 302. In this case, depending on the size of the clip, there are cases where the clip latch protrusion 140A or 140B provided in the center of the bus bar supporting wall in Patent Document 1 opposes the depression 302 such that latching cannot be performed.

In this case, the rescue terminal portion cannot be reliably clamped by the booster cable clip, connection stability degrades, and there is a risk of no longer being able to smoothly perform the task of charging the battery.

The present electrical connection box was achieved in order to resolve the above-described problems, and an object thereof is to make it possible to reliably hold the cover member of the booster cable connection portion at an isolating position and easily perform the opening operation, and make it possible to stably perform the charging task with a configuration in which the clip pieces on the two sides have been brought into contact with the terminal portion and clamp it regardless of the size of the alligator clip.

SUMMARY

In order to achieve the aforementioned object, according to a first aspect, there is provided an electrical connection box including a terminal supporting wall that has a rescue terminal portion of a bus bar arranged on a front surface and is provided as a single piece with a block main body, and a cover member that exposes and covers the terminal supporting wall and the rescue terminal portion, wherein bearing holes are provided in the terminal supporting wall on one end side in a left-right direction, rotation support shaft portions that are rotatably fitted into the bearing holes are provided as protrusions on the cover member, the rescue terminal portion is exposed by rotating the cover member from an opening/closing end on another end side in the left-right direction with the rotation support shaft portions serving as fulcrums, and ribs for isolating state holding are provided as protrusions on the opening/closing end side of the cover member and are semi-locked into latching depressions provided on the terminal supporting wall.

According to the electrical connection box having the above configuration, when the battery has died, an occupant can easily expose the rescue terminal portion to the outside by merely gripping the opening/closing end side of the cover member and rotating it. Also, when the opening operation is performed, the cover member can be held without becoming separated from the block main body of the electrical connection box. Accordingly, after the booster cable clip has been connected to the rescue terminal portion and the emergency charging task has ended, the task of isolating the rescue terminal portion using the cover member is not forgotten, thus making it possible to improve safety. Furthermore, the ribs are semi-locked to the latching depressions in the state in which the cover member is at the isolating position, thus making it possible to prevent the cover member from inadvertently opening due to vehicle vibration or the like, and making it possible to further improve safety.

It is preferable that step-shaped depressions are provided on a rear surface of the terminal supporting wall, a pair of terminal protrusions provided on two sides of tips of clip pieces on two sides of an alligator clip connected to a booster cable being fitted into and latched by the step-shaped depressions, and a terminal protrusion of the clip piece on one side of the alligator clip is brought into contact with the rescue terminal portion on the front surface side, and the pair of terminal protrusions of the clip piece on the other side of the alligator clip are respectively fitted into and latched by the step-shaped depressions on the rear surface side such that clamping is achieved.

Also, according to a second aspect, there is provided an electrical connection box in which a terminal supporting wall that has a rescue terminal portion of a bus bar arranged on a front surface is provided as a single piece with a block main body, wherein step-shaped depressions are provided on a rear surface of the terminal supporting wall, a pair of terminal protrusions provided on two sides of tips of clip pieces on two sides of an alligator clip connected to a booster cable being fitted into and latched by the step-shaped depressions, and a terminal protrusion of the clip piece on one side of the alligator clip is brought into contact with the rescue terminal portion on the front surface side, and the pair of terminal protrusions of the clip piece on the other side of the alligator clip are respectively fitted into and latched by the step-shaped depressions on the rear surface side such that clamping is achieved.

With the electrical connection box according to the second aspect, the rescue terminal portion is arranged on the front surface of the terminal supporting wall, and a pair of wide step-shaped depressions are provided on the rear surface. Accordingly, even if there are variations in the size of the alligator clip connected to the booster cable, and there are variations in the dimension between the pair of terminal protrusions provided at the tips of the clip pieces on the two sides, the terminal protrusions of the clip can be fitted into and latched to the pair of step-shaped depressions provided on the rear surface of the terminal supporting wall. Accordingly, when the battery has died and it is necessary to perform emergency charging in order to start the engine, various sizes of alligator clips can be supported, and the configuration is user-friendly.

Note that it is preferable that the electrical connection box according to the second aspect also includes a cover member for covering/exposing the terminal supporting wall similarly to the first aspect, but it is possible to provide a cover member having another configuration, and arrange the rescue terminal portion on the front surface and provide a pair of step-shaped depressions on the rear surface to obtain a clip latching portion.

It is preferable that the electrical connection box is a fuse relay box or the like installed in an engine room or engine compartment of a hybrid automobile, a bus bar for connection to a battery installed in a rear portion of the automobile is accommodated inside the block main body of the electrical connection box, and the rescue terminal portion is formed by extending a portion of the bus bar upward, and the terminal supporting wall is provided by extending a partition wall in the block main body upward as a projection, and when the cover member attached to the terminal supporting wall is rotated to an opened position, the cover member is located higher than a fuse and/or relay installed in the block main body. Note that the present invention is not limited to a hybrid automobile, and is also applicable to electric automobiles and the like.

With the electrical connection box according to the first aspect, when the battery has died, an occupant can easily expose the rescue terminal portion to the outside by merely gripping the opening/closing end side of the cover member and rotating it. Also, when the opening operation is performed, the cover member can be held without becoming separated from the block main body of the electrical connection box. Accordingly, the task of isolating the rescue terminal portion using the cover member after performing the connection task is not forgotten, thus making it possible to improve safety. Furthermore, the ribs are semi-locked to the latching depressions in the state in which the cover member is at the isolating position, thus making it possible to prevent the cover member from inadvertently opening, and making it possible to further improve safety.

With the electrical connection box according to the second aspect, the rescue terminal portion is arranged on the front surface of the terminal supporting wall, and a pair of wide step-shaped depressions are provided on the rear surface, and therefore even if there are variations in the size of the alligator clip connected to the booster cable, and there are variations in the dimension between the pair of terminal protrusions provided at the tips of the clip pieces on the two sides, the clip can be reliably latched, and the rescue terminal portion can be brought into contact with the clip. In this way, it is possible to support alligator clips having various sizes, and user-friendliness in an emergency can be improved.

DRAWINGS

FIG. 1A is a perspective view of a state in which a cover member of a booster cable connection portion has been opened, and FIG. 1B is a perspective view of a relevant portion in a state in which the cover member has been closed;

FIG. 2A is a perspective view from ahead, and FIG. 2B is a perspective view from behind;

FIG. 4A is a front view of the cover member of the booster cable connection portion before being put in the isolating state, and FIG. 4B is a cross-sectional view of FIG. 4A;

FIG. 5A is a plan view, FIG. 5B is a cross-sectional view taken along line C-C in FIG. 5A, FIG. 5C is a cross-sectional view taken along line D-D in FIG. 5A, and FIG. 5D is a cross-sectional view taken along line E-E in FIG. 5A;

FIG. 7A is a perspective view, FIG. 7B is a front view of FIG. 7A.

FIG. 8A is a perspective view, FIG. 8B is a front view of FIG. 8A, FIGS. 9A to 9C are drawings showing a conventional example.

DESCRIPTION

Figure 1A:
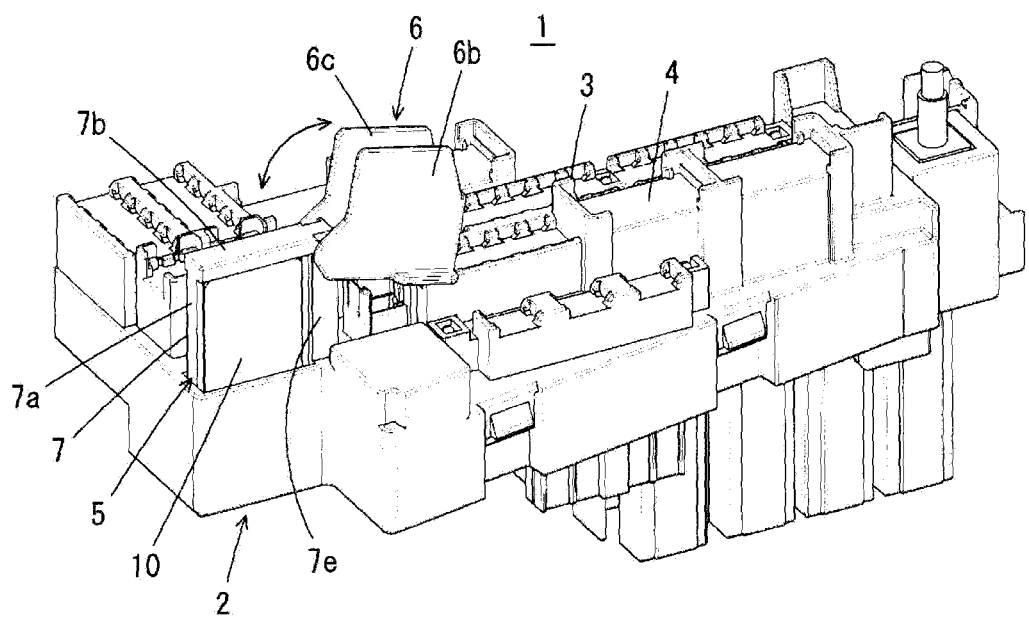
FIGS. 1A and 1B show an electrical connection box according to an embodiment of the present invention, where

An electrical connection box 1 of the present embodiment is constituted by a relay fuse box installed in the engine room or engine compartment of a hybrid automobile. The electrical connection box 1 includes a block main body 2. A fuse installation portion 3 and a relay installation portion 4 are provided on the upper surface of the block main body 2, and a booster cable connection portion 5 is provided in a portion that follows the left edge in FIGS. 1A and 1B. The booster cable connection portion 5 projects upward more than the surrounding fuses and the relay installation portion. Accordingly, a cover member 6 of the booster cable connection portion 5 can be positioned at the opened position shown in FIG. 1A.

The booster cable connection portion 5 is constituted by a terminal supporting wall 7 that is formed as a single piece with the block main body 2, a rescue terminal portion 10 that is an emergency charging terminal portion arranged on one surface of the terminal supporting wall 7, and the openable/closable cover member 6 that covers the rescue terminal portion 10 and the terminal supporting wall 7. The rescue terminal portion 10 is formed by extending a portion of the bus bar 11 accommodated in the block main body 2 to a position along the front surface of the terminal supporting wall 7. The bus bar 11 is connected to a battery installed in the rear portion of the vehicle via a power supply line.

The electrical connection box 1 is assembled by accommodating and fixing the block main body 2 in a main body cover (not shown), and joining an upper cover and a lower cover to the main body cover in a locked manner.

Figure 1B:
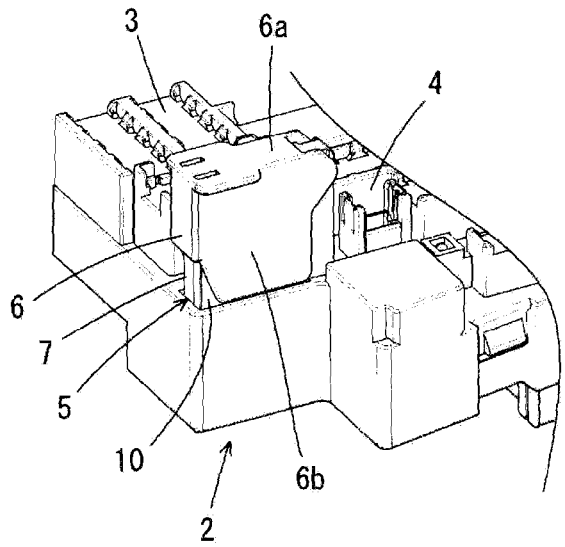
Figure 2A:
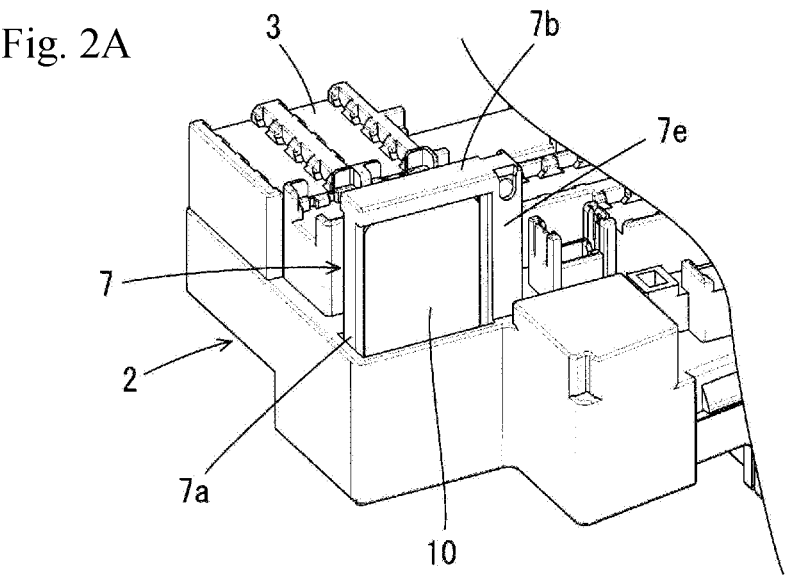
FIGS. 2A and 2B show the booster cable connection portion in a state in which the cover member in FIGS. 1A and 1B has been removed, where
Figure 2B:
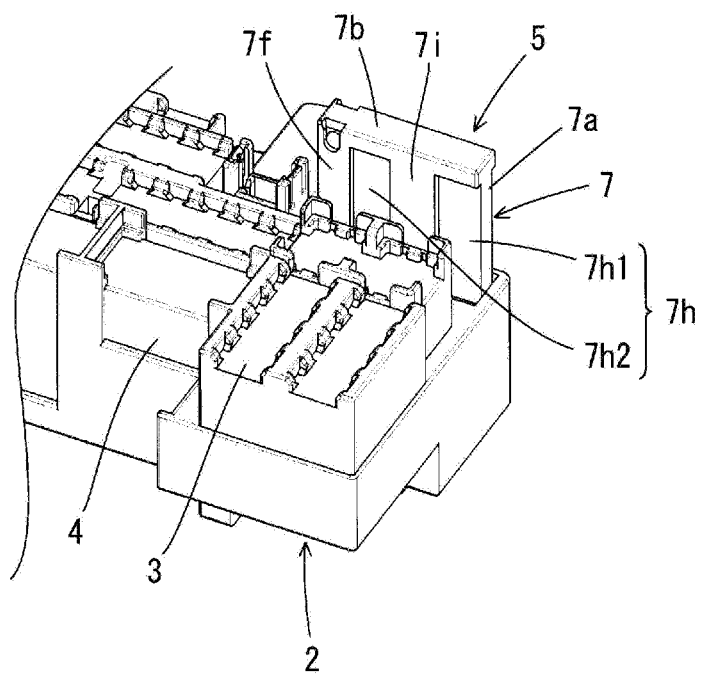
Figure 6A:
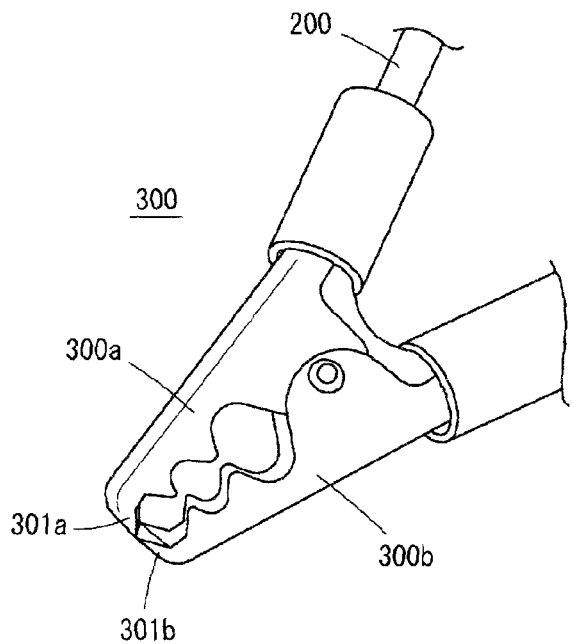
FIG. 6A is a perspective view of a clip connected to a booster cable.
Figure 6B:
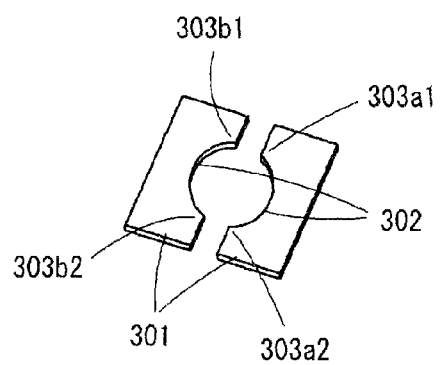
FIG. 6B is a schematic view of tip bent portions of clip pieces on the two sides of the clip.
Figure 6C:
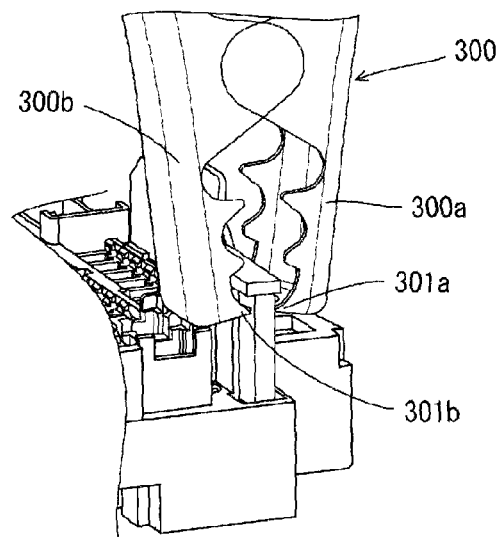
FIG. 6C is a perspective view of a state in which the clip is connected to the booster cable connection portion.

If the battery dies, it can be connected to the battery in another vehicle to perform emergency charging, and when a clip 300 of a booster cable 200 shown in FIGS. 6A to 6C is to be connected to the rescue terminal portion 10 of the booster cable connection portion 5, the upper cover is removed, and then the cover member 6 is rotated from the closed position shown in FIG. 1B to the opened position shown in FIG. 1A.

Note that the electrical connection box is not limited to a relay fuse box having a relay and a fuse installed therein, and may be an electrical connection box in which only a relay or a fuse is installed, or may be a junction box.

The booster cable connection portion 5 has the structure shown in detail in FIGS. 3A to 5D. Specifically, as shown in FIG. 3B a main body portion 7a, which constitutes the central portion and the left-side portion of the terminal supporting wall 7, is constituted by a single flat plate that projects upward from an internal partition wall 13 of the block main body 2. The plate thickness (t) of the main body portion 7a is set to a dimension that can be clamped by terminal protrusions 303a1 and 303b1 and terminal protrusions 303a2 and 303b2 on two sides sandwiching circular arc-shaped depressions 302 in the centers of tip bent portions 301a and 301b of a pair of clip pieces 300a and 300b of the alligator clip 300 shown in FIGS. 6A to 6C.

A wide upper plate portion 7b is provided in a projecting manner on the upper end of the main body portion 7a of the terminal supporting wall 7, and latching depressions 7c and 7d are provided on respective width-direction sides of the lower surface of the upper plate portion 7b. A right-side portion that serves as the rotation fulcrum of the cover member 6 is provided with a pair of bearing portions 7e and 7f that project from the main body portion 7a, and a pair of circular bearing holes 7e1 and 7f1 located between the upper plate portion 7b and the bearing portions 7e and 7f.

The upper plate portion 7b and the bearing portions 7e and 7f project out from both the front and rear surfaces of the main body portion 7a of the terminal supporting wall 7, which are wide surfaces, and a front surface 7g surrounded by the upper plate portion 7b and the bearing portion 7e, and a rear surface 7h surrounded by the upper plate portion 7b and the bearing portion 7f are in a state of being depressed by one level.

The rescue terminal portion 10 that projects upward from the bus bar 11 is arranged on approximately the entirety of the front surface 7g having a depression. A step-shaped protrusion 7i that is continuous with the upper plate portion 7b is provided in the center of the rear surface 7h having depressions on the opposite side, and a pair of left and right depression step portions 7h1 and 7h2 are provided on respective sides of the step-shaped protrusion 7i. In other words, the rescue terminal portion 10 is arranged on the front surface 7g of the terminal supporting wall 7, and the pair of left and right depression step portions 7h1 and 7h2 provided on the rear surface that is the opposite surface are depressions that fit with the pair of left and right terminal protrusions 303a1 and 303a2 or 303b1 and 303b2 that sandwich the depressions 302 at the tip of the alligator mouth shape of the clip 300.

Figure 5A:
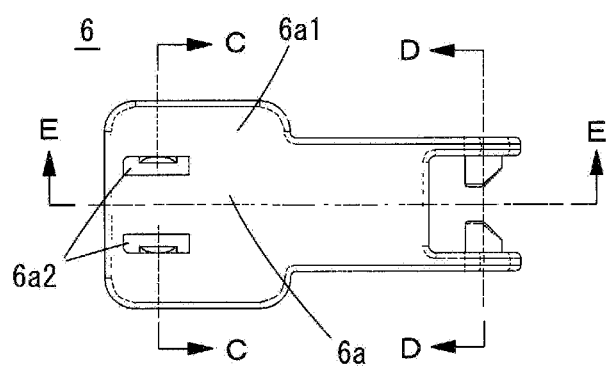
FIGS. 5A to 5D show the cover member, where
Figure 5B:
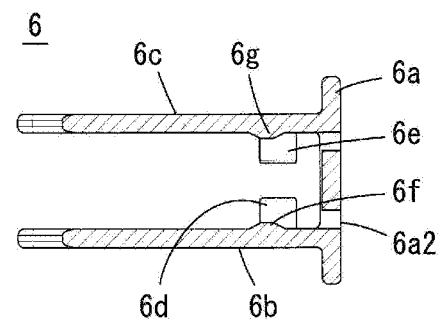
Figure 5D:
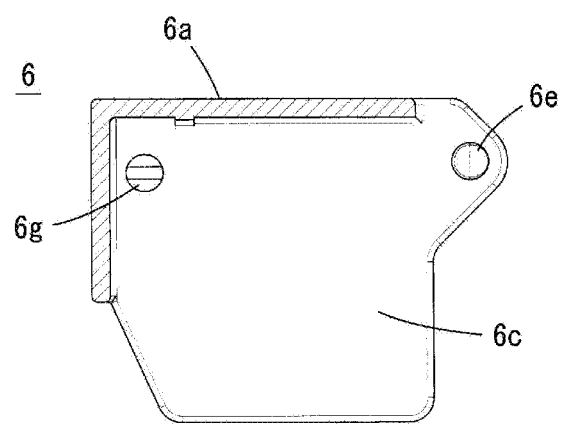
Figure 5C:
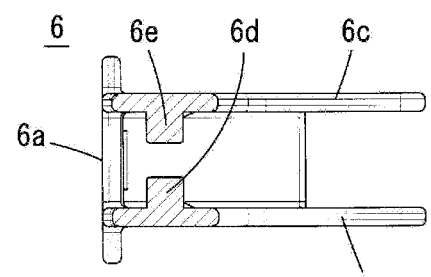

As shown in FIG. 5A and the like, the cover member 6 that covers the terminal supporting wall 7 is shaped so as to include an upper plate portion 6a, side plate portions 6b and 6c that extend downward from the front and rear ends of the lower surface of the upper plate portion 6a, rotation support shaft portions 6d and 6e constituted by circular column-shaped ribs that project from the inner surfaces on the right end sides of the side plate portions 6b and 6c, and hemispherical ribs 6f and 6g that are for preventing opening and project from the inner surfaces on the left end sides of the side plate portions 6b and 6c.

The upper plate portion 6a of the cover member 6 is placed over the upper plate portion 7b of the terminal supporting wall 7, and in FIG. 5A, the right end side is the rotation fulcrum, and the left end is the opening/closing-side end portion. The left-side portion in the figure that is the opening side is extended in the front-back direction to become a wide portion 6a1, and is the portion that is pinched when opening the cover member 6. A pair of impressions 6a2, which are for forming the ribs 6f and 6g provided on the side plate portions 6b and 6c, are provided in the upper plate portion 6a.

Figure 3A:
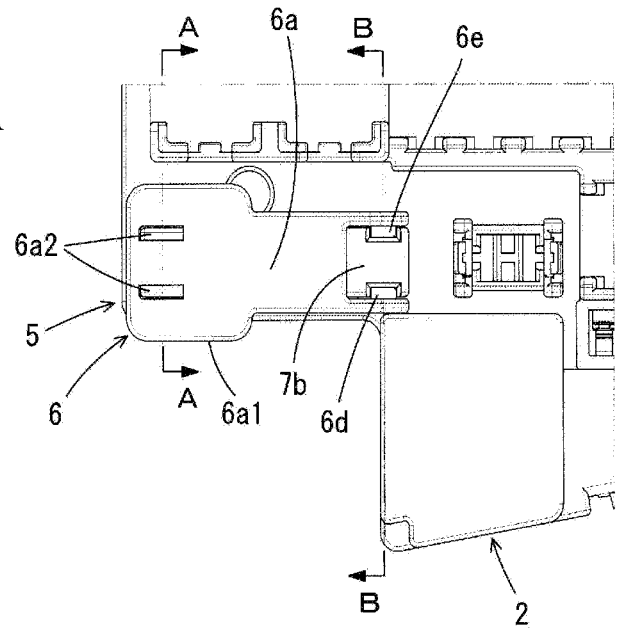
FIG. 3A is a plan view of the cover member of the booster cable connection portion in the isolating state.
Figure 3B:
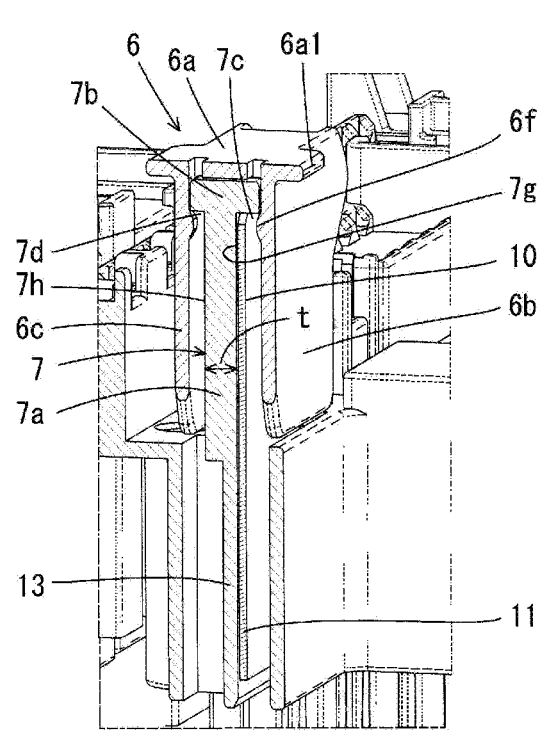
FIG. 3B is a perspective view of a cross-section taken along line A-A in FIG. 3A.
Figure 3C:
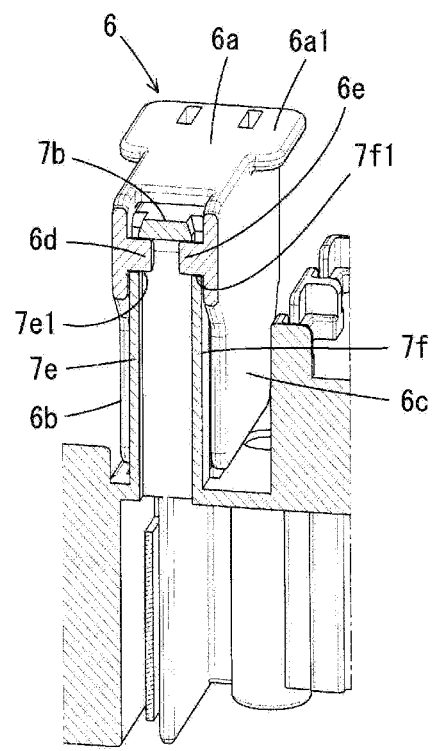
FIG. 3C is a perspective view of a cross-section taken along line B-B in FIG. 3A.

The rotation support shaft portions 6d and 6e respectively provided on the side plate portions 6b and 6c of the cover member 6 are rotatably fitted into the bearing holes 7e1 and 7f1 of the terminal supporting wall 7, thus enabling the cover member 6 to be opened and closed with the rotation support shaft portions 6d and 6e serving as the rotation fulcrum. Also, when the cover member 6 is in the isolating state, the ribs 6f and 6g respectively provided on the side plate portions 6b and 6c are fitted into, in a semi-locked state, the latching depressions 7c and 7d as shown in FIG. 3B, and thus the cover member 6 is held in the isolating state so as to not be opened inadvertently when not in use.

When an operation is performed to open the cover member 6 from the isolating state in which the hemispherical ribs 6f and 6g are caught in the latching depressions 7c and 7d, an occupant performs a one-handed opening operation for lifting up the opening/closing side of the upper plate portion 6a of the cover member 6, such that the ribs 6f and 6g can be disengaged while sliding along the two end portions of the upper plate portion 7b, whereas when the cover member 6 is rotated to the isolating position and pressed down fully, the ribs 6f and 6g can be fitted into the latching depressions 7c and 7d.

With the electrical connection box 1 having the above configuration, normally the cover member 6 is in the isolating state of being placed over the booster cable connection portion 5 in which the rescue terminal portion 10 is attached to the terminal supporting wall 7, thus making it possible to prevent the rescue terminal portion 10 from being exposed to the outside, and prevent a short or the like occurring due to coming into contact with another member. Furthermore, since the ribs 6f and 6g of the cover member 6 are in a semi-locked state of being latched in the latching depressions 7c and 7d of the terminal supporting wall 7, the latching is not lost due to vehicle vibration or the like, and it is possible to prevent inadvertent opening when not in use.

On the other hand, if the battery dies and the engine can no longer be started, it is possible to start the engine by opening the hood of the automobile and connecting the rescue terminal portion 10 of the electrical connection box 1 installed in the engine room or engine compartment to the battery in another automobile via a booster cable.

Specifically, the upper cover of the electrical connection box 1 is removed, the booster cable connection portion 5 is shifted from the state of being isolated by the cover member 6 as shown in FIG. 1B to the open state shown in FIG. 1A by rotating the cover member 6 in the clockwise direction, thus exposing the rescue terminal portion 10 to the outside. In the operation for opening the cover member 6, the hemispherical ribs 6f and 6g are caught in the latching depressions 7c and 7d of the terminal supporting wall 7, and therefore can be easily unlatched by an operation in which the occupant lifts up the cover member 6 with one hand. When the occupant pinches the upper plate portion 6a of the cover member 6 and rotates it in the clockwise direction, the rotation support shaft portions 6d and 6e rotate in the bearing holes 7e1 and 7f1 of the terminal supporting wall 7, the upper plate portion 6a, which is on the lower surface side, stops at a position of coming into contact with a peripheral electrical part or the upper wall of the main body cover, and the cover member 6 is held at the opened position of being rotated approximately 180 degrees as shown in FIGS. 1A, 7A and 7B, and 8A and 8B. In this way, when the cover member 6 is at the opened position, the rotation support shaft portions 6d and 6e are held in the bearing holes 7e1 and 7f1 of the terminal supporting wall 7, and the cover member 6 is held without becoming separated from the terminal supporting wall 7 of the block main body 2.

As described above, after the cover member 6 is placed at the opened position, the rescue terminal portion 10 is in a state of being exposed to the outside, and as shown in FIGS. 6C and 7A to 8C, the clip 300 connected to the tip of the booster cable 200 is connected to the rescue terminal portion 10.

Since the clip 300 is an alligator clip, the rescue terminal portion 10 on the front surface side of the terminal supporting wall 7 and the rear surface 7h of the terminal supporting wall 7 are clamped by the tip bent portions 301a and 301b of the pair of clip pieces 300a and 300b that are connected by a spring (not shown). Specifically, as shown in FIGS. 7C and 8C, the terminal protrusions 303a1 and 303a2 on the two sides sandwiching the depression 302 in the center of the tip bent portion 301a of the one clip piece 300a come into contact with the rescue terminal portion 10. In the tip bent portion 301b of the other clip piece 300b, the depression 302 in the center fits around the step-shaped protrusion 7i in the center of the rear surface side of the terminal supporting wall 7. Also, out of the terminal protrusions 303b1 and 303b2 on the two sides, the one terminal protrusion 303b1 fits into the depression step portion 7h1, and the other terminal protrusion 303b2 fits into the depression step portion 7h2. Moreover, since the two side portions of the upper plate portion 7b project outward at the top end of the depression step portions 7h1 and 7h2, the lower surface of the upper plate portion 7b functions as an upward latching portion for the terminal protrusions 303b1 and 303b2 of the clip.

Figure 7A:
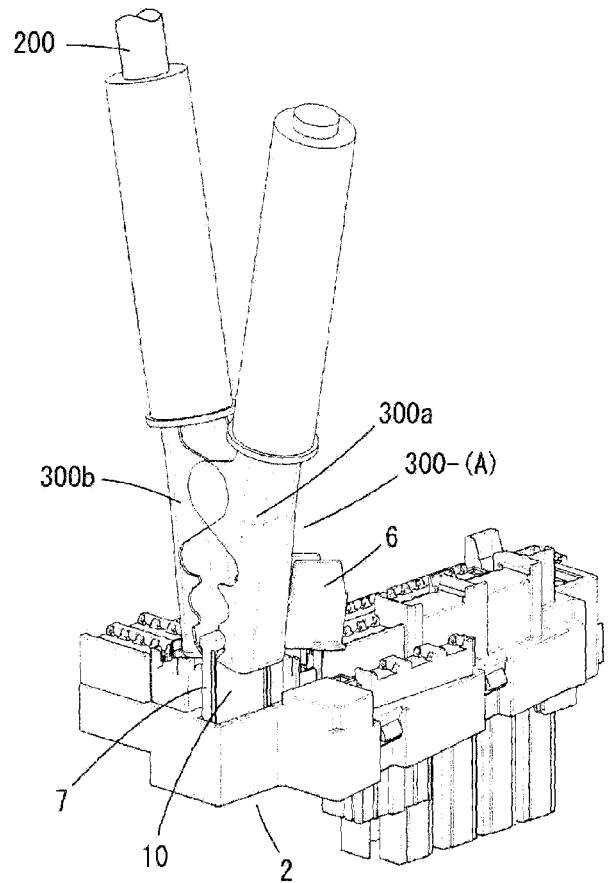
FIGS. 7A and 7B show a state in which a large-size clip is connected to the booster cable connection portion, where
Figure 7B:
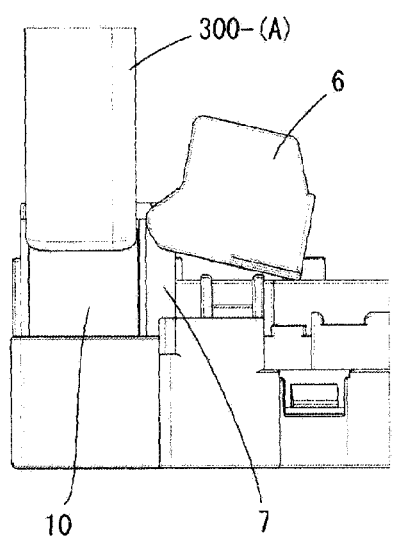
Figure 7C:
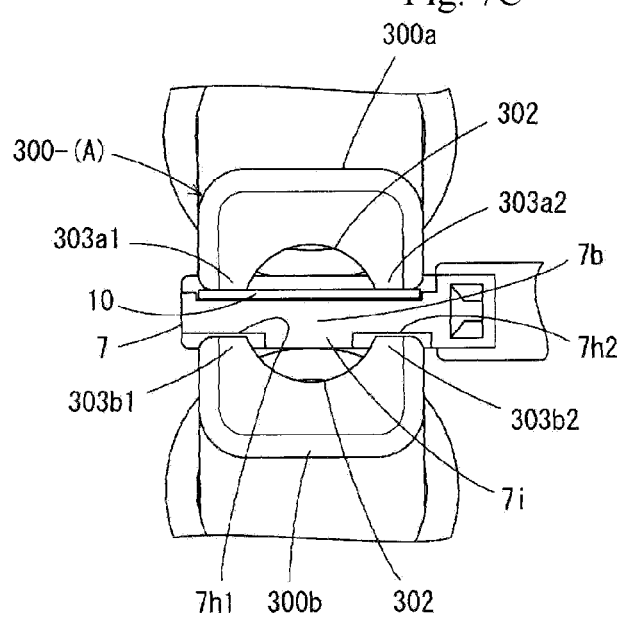
FIG. 7C is a plan view of a relevant portion in a state in which the tip of the alligator mouth shape of the clip is connected to the terminal.
Figure 8A:
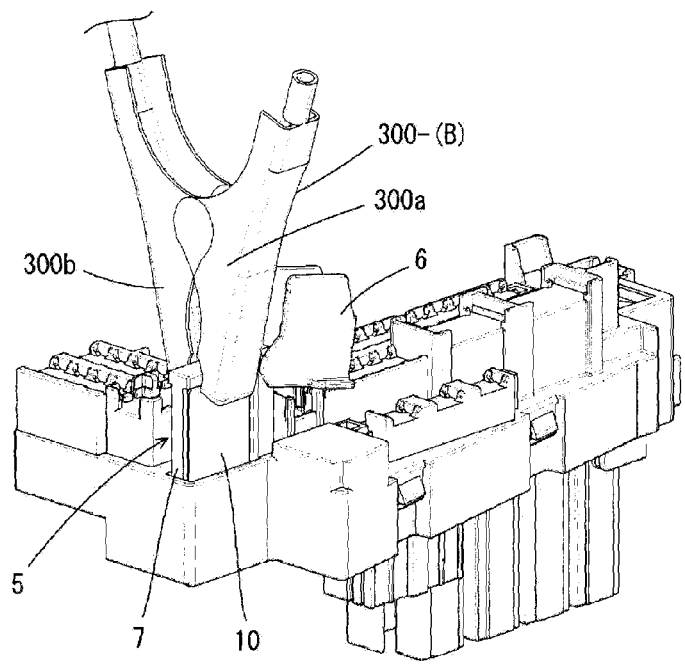
FIGS. 8A and 8B show a state in which a small-size clip is connected to the booster cable connection portion, where
Figure 8B:
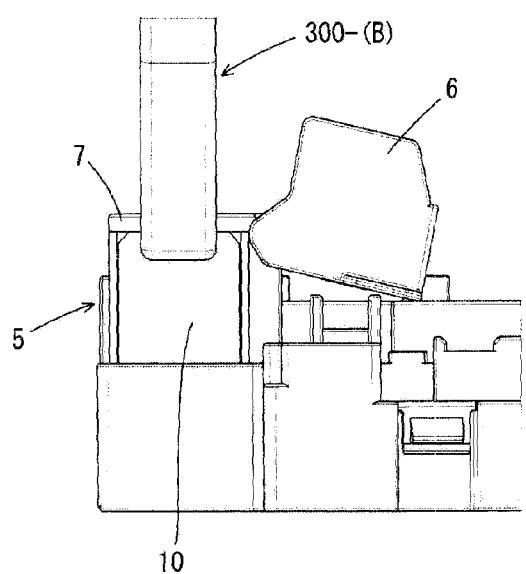
Figure 8C:
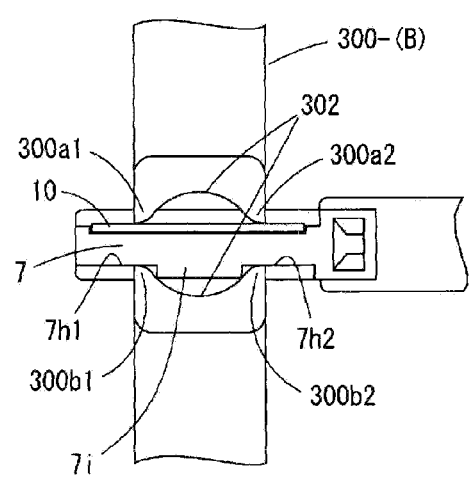
FIG. 8C is a plan view of a relevant portion in a state in which the tip of the alligator mouth shape of the clip is connected to the terminal.

If a large-size alligator clip 300-A shown in FIGS. 7A to 7C is used, the depressions 302 in the center of the tip bent portions are larger, and the opening dimensions of the terminal protrusions 303b1 and 303b2 on the two sides are larger. On the other hand, if a small-size alligator clip 300-B shown in FIGS. 8A to 8C is used, the depressions 302 in the center of the tip bent portions are smaller, and the opening dimensions of the terminal protrusions 303b1 and 303b2 on the two sides are smaller.

Since the pair of wide depression step portions 7h1 and 7h2 are provided on the two sides of the step-shaped protrusion 7i in the center on the rear surface 7h of the terminal supporting wall 7, regardless of which of the differently-sized alligator clips 300-A and 300-B is used, the terminal protrusions 303b1 and 303b2 on the two sides can be fitted into the depression step portions 7h1 and 7h2. Moreover, the upper plate portion 7b at the upper portion of the depression step portions 7h1 and 7h2 projects outward to constitute latching portions. Accordingly, even if differently-sized alligator clips 300 are used, the terminal protrusions 303b1 and 303b2 on the two sides of the tips can be reliably held in the depression step portions 7h1 and 7h2, and an electrical connection can be stably made via the booster cable 200.

When charging using the booster cable ends, the occupant detaches the clip 300 from the booster cable connection portion 5, and then rotates the cover member 6 at the opened position in the counter-clockwise direction. If the upper plate portion 6a of the cover member 6 is pressed downward when the rotation ends, the ribs 6f and 6g can be fitted into the latching depressions 7c and 7d of the terminal supporting wall 7 so as to be in a semi-locked state. Thereafter, the upper cover is returned, and the task is ended.

As described above, with the present electrical connection box, the cover member 6 exposes and covers the terminal supporting wall 7 and the rescue terminal portion 10 of the booster cable connection portion 5 is rotatably joined to the terminal supporting wall 7, and therefore does not become separated from the block main body 2, on which the terminal supporting wall 7 is provided, when opened. Accordingly, isolation by the cover member 6 can be performed without being forgotten, it is possible to reliably prevent exposure of the rescue terminal portion 10, and it is possible to protect the rescue terminal portion 10 and prevent a short caused by contact with another member. Moreover, when the cover member 6 is at the isolating position, the ribs 6f and 6g are latched by the latching depressions in the terminal supporting wall 7 in a semi-locked state, thus making it possible to prevent the cover member 6 from inadvertently coming open from the isolating state, while also making it possible to easily release the latching when the opening task needs to be performed, by the occupant performing the task of simply rotating the cover member 6 with one hand, thus improving the ease of operation.

Furthermore, since the pair of wide step-shaped depressions 7h1 and 7h2 are provided in the rear surface of the terminal supporting wall 7 that has the rescue terminal portion 10 arranged on the front surface, there are advantages such as that, regardless of which of the differently-sized alligator clips 300-A and 300-B is used, it can be reliably brought into contact with the rear surface of the terminal supporting wall 7, and the task of connecting the rescue terminal portion 10 and the clip can be performed stably.

The present invention is not limited to the above embodiment, the clip connected to the booster cable is not limited to being an alligator clip, and even if another clip is used, the terminal portions at the tips can be brought into contact with the wide step-shaped depressions in the rear surface of the terminal supporting wall, and the upper plate portion can be caused to function as latch protrusions, thus making it possible to reliably make a connection.

Also, the electrical connection box is not limited to being a fuse relay box, and the present invention is also applicable to an electrical connection box that accommodates a bus bar connected to a battery, such as a junction box.

The invention claimed is:

1. An electrical connection box comprising a terminal supporting wall that has a rescue terminal portion of a bus bar arranged on a front surface and is provided as a single piece with a block main body, and a cover member that exposes and covers the terminal supporting wall and the rescue terminal portion;
wherein bearing holes are provided in the terminal supporting wall on one end side in a left-right direction, rotation support shaft portions that are rotatably fitted into the bearing holes are provided as protrusions on the cover member, the rescue terminal portion is exposed by rotating the cover member from an opening/closing end on another end side in the left-right direction with the rotation support shaft portions serving as fulcrums, and ribs for holding the cover member in an isolating state are provided as protrusions on the opening/closing end side of the cover member and are semi-locked into latching depressions provided on the terminal supporting wall.

2. The electrical connection box according to claim 1, wherein step-shaped depressions are provided on a rear surface of the terminal supporting wall, a pair of terminal protrusions provided on two sides of tips of clip pieces on two sides of an alligator clip connected to a booster cable being fitted into and latched by the step-shaped depressions; and
a terminal protrusion of the clip piece on one side of the alligator clip is brought into contact with the rescue terminal portion on the front surface side, and the pair of terminal protrusions of the clip piece on the other side of the alligator clip are respectively fitted into and latched by the step-shaped depressions on the rear surface side such that clamping is achieved.

3. An electrical connection box comprising a terminal supporting wall that has a rescue terminal portion of a bus bar arranged on a front surface is provided as a single piece with a block main body;
wherein step-shaped depressions are provided on a rear surface of the terminal supporting wall, a pair of terminal protrusions provided on two sides of tips of clip pieces on two sides of an alligator clip connected to a booster cable being fitted into the step-shaped depressions; and
a terminal protrusion of the clip piece on one side of the alligator clip is brought into contact with the rescue terminal portion on the front surface side, and the pair of terminal protrusions of the clip piece on the other side of the alligator clip are respectively fitted into and latched by the step-shaped depressions on the rear surface side such that clamping is achieved.

4. The electrical connection box according to claim 1, wherein the electrical connection box is a fuse relay box or the like installed in an engine compartment of a hybrid automobile, a bus bar for connection to a battery installed in a rear portion of the automobile is accommodated inside the block main body of the electrical connection box, and the rescue terminal portion is formed by extending a portion of the bus bar upward; and
the terminal supporting wall is provided by extending a partition wall in the block main body upward as a projection, and when the cover member attached to the terminal supporting wall is rotated to an opened position, the cover member is located higher than a fuse and/or relay installed in the block main body.

5. The electrical connection box according to claim 3, wherein the electrical connection box is a fuse relay box or the like installed in an engine compartment of a hybrid automobile, a bus bar for connection to a battery installed in a rear portion of the automobile is accommodated inside the block main body of the electrical connection box, and the rescue terminal portion is formed by extending a portion of the bus bar upward; and
the terminal supporting wall is provided by extending a partition wall in the block main body upward as a projection, and when the cover member attached to the terminal supporting wall is rotated to an opened position, the cover member is located higher than a fuse and/or relay installed in the block main body.

* * * * *